(12) United States Patent
Herrn et al.

(10) Patent No.: US 9,024,231 B2
(45) Date of Patent: May 5, 2015

(54) LASER OPTICS WITH PASSIVE SEAM TRACKING

(71) Applicant: Scansonic MI GmbH, Berlin (DE)

(72) Inventors: Steffen Walter Herrn, Berlin (DE); Andre Lange Herrn, Berlin (DE)

(73) Assignee: Scansonic MI GmbH, Berlin, DE (US)

( * ) Notice: Subject to any disclaimer, the term of this patent is extended or adjusted under 35 U.S.C. 154(b) by 343 days.

(21) Appl. No.: 13/690,770

(22) Filed: Nov. 30, 2012

(65) Prior Publication Data

US 2013/0161299 A1 Jun. 27, 2013

(30) Foreign Application Priority Data

Nov. 30, 2011 (EP) .................................. 11191367

(51) Int. Cl.
*B23K 26/04* (2014.01)
*B23K 26/24* (2014.01)
*B23K 26/02* (2014.01)
*B23K 26/08* (2014.01)
*B23K 26/06* (2014.01)

(52) U.S. Cl.
CPC ........... *B23K 26/023* (2013.01); *B23K 26/0807* (2013.01); *B23K 26/0639* (2013.01); *B23K 26/24* (2013.01); *B23K 26/04* (2013.01); *B23K 26/045* (2013.01)

(58) Field of Classification Search
CPC ........ B23K 26/02; B23K 26/04; B23K 26/24; B23K 26/26; B23K 26/28; B23K 26/30
USPC ............. 219/121.61–121.66, 121.75, 121.78, 219/121.79, 121.83; 228/102, 244, 8–12, 228/41; 29/407.04; 700/166
See application file for complete search history.

(56) References Cited

U.S. PATENT DOCUMENTS

| 4,588,872 A | * | 5/1986 | Bollinger et al. | ........ 219/124.34 |
| 2004/0134891 A1 | * | 7/2004 | Schumacher | ............ 219/121.63 |

FOREIGN PATENT DOCUMENTS

| DE | 102005019422 | 11/2005 |
| EP | 1762328 | 3/2007 |

OTHER PUBLICATIONS

Extended European Search Report for European Patent Application No. 11191367.9 dated May 15, 2012, 4 pages.

* cited by examiner

*Primary Examiner* — Samuel M Heinrich
(74) *Attorney, Agent, or Firm* — Sheridan Ross P.C.

(57) ABSTRACT

The present invention relates to a device for guiding a laser beam along a target path, particularly a joint. It has a laser beam input module that guides an incident laser beam onto a swiveling beam guiding device downstream from the laser beam input module. The beam guiding device projects the laser beam onto the target path. Said beam guiding device comprises a tactile sensor connected to the swiveling optic that is designed to perform a tactile scan of the target path and to deflect the swiveling optic appropriately. According to the invention, an intermediate focal point is located in the beam path of the laser beam between laser beam input module and swiveling optic. Moreover, the swivel axis of the swiveling optic runs through the intermediate focal point.

15 Claims, 5 Drawing Sheets

LASER OPTICS WITH PASSIVE SEAM TRACKING

CROSS REFERENCE TO RELATED APPLICATIONS

This application claims the benefit of European Patent Application No. 11191367.9 filed Nov. 30, 2011, the disclosure of which is incorporated herein by reference.

FIELD OF THE INVENTION

The present invention relates to a device for guiding a laser beam, particularly along a seam or a joint, for example for use in a laser processing system. The invention is particularly suitable for use in the fields of laser joining and laser hardening.

TECHNICAL BACKGROUND OF THE INVENTION

During joining, a laser processing head must be guided with precision along the seam in order to produce high-quality fillet welds and flanged seams, for example. Compared to optically implemented beam guidance systems, laser processing optics with tactile tracking offer several advantages that manifest themselves, for example, in compact and comparatively simple constructions as well in a precisely guided laser beam.

The principle of tactile seam tracking and a corresponding device is described in European patent EP 1762328 A1. To track the beam, the mechanical sensor is coupled there to a beam deflection module via a rotary module. The rotary module has an elastic energy store in the form of two spiral springs into which the beam deflection module engages with the aid of two so-called drivers. In the case of a swiveled-out beam deflection module, restorative forces act via the rotary module to return the beam deflection module to a resting position, particularly when no external forces are acting on the mechanical sensing device. The rotary module is therefore embodied in two parts, with the first of the two sub-units of the elastic energy store, i.e., the first spring, acting in one of the two directions of deflection and the other sub-unit, i.e., the second spring, acting in the other direction of deflection. The two springs act against each other according to the illustration in FIG. 2 and FIG. 3 of document EP 1762328 A1. In this, the range of action of each of the two sub-units ends at the middle position of the beam deflection module. The range of action of the two sub-units is limited there by a stop.

It is a technical problem of the present invention to provide an alternative device for the tactile guidance of a laser beam.

DESCRIPTION OF THE INVENTION

The abovementioned technical problem is solved according to the invention by a device for guiding a laser beam along a target path which comprises the following components:
a laser beam input module that is designed to guide an incident laser beam onto a swiveling beam guiding device downstream from the laser beam input module, the beam guiding device being arranged to project the laser beam onto the target path and comprising
optic that can be swiveled along at least one swivel axis and
a tactile sensor connected to the swiveling optic that is designed to perform a tactile scan of the target path and to deflect the swiveling optic accordingly,
an intermediate focal point being located in the beam path of the laser beam in front of the swiveling optic and the swivel axis of the swiveling optic running through the intermediate focal point.

The additional generation of a stationary intermediate focal point makes it possible for the beam guiding device, particularly the swiveling part, to manage with significantly fewer components than is known in the prior art. Only the sensor and the swiveling optic firmly connected to the sensor (hereinafter also called "optic") swivel along a rotational line around the stationary intermediate focus. This significantly reduces the moment of inertia of the swiveling parts, and faster and more precise tracking of the laser focus is possible.

This permits a more compact construction than previously known tracking devices as well as a smoother tracking of the laser focus. It follows, for instance, from EP 1762328 A1 that the incident laser beam is first guided via a first deflecting mirror onto a second deflecting mirror which then guides the laser beam onto a focusing optic that is part of the abovementioned beam deflection module. To track the laser focus, the entire beam deflection module must therefore be swiveled with all of its components by means of the rotary module. Besides the focusing optic, the beam deflection module also includes, for example, a housing, a protective glass, a linear guide, etc.

In the device according to the invention, the intermediate focus is preferably reproduced by the swiveling optic on the target path. The swiveling optic is therefore mobile imaging optic. The target path can correspond, for example, to the path of a joint between two workpieces to be processed.

The at least one swivel axis is preferably the direction perpendicular to the direction of the laser beam (z-direction) and target path (x-direction), i.e., it is preferably the lateral deflection direction (y-direction).

In a preferred embodiment, the laser beam input module is designed to focus the laser beam onto the intermediate focal point. In this case, the swiveling optic is embodied so as to reproduce the intermediate focal point on the target path. That is, the swiveling optic has an "object-side" focus that is located in the intermediate focal point and an "image-side" focus that is located on the target path.

In another preferred embodiment, the laser beam input module is embodied as an optical fiber. In this case, the intermediate focal point is located on the end of the optical fiber oriented toward the swiveling optic. Moreover, the swiveling optic is designed to reproduce the intermediate focal point on the target path.

In another preferred embodiment, the laser beam input module is designed to produce a beam path that is not focused on the intermediate focal point but rather, for example, one that is divergent, collimated or perhaps only weakly focused. In this case, the swiveling optic has a virtual intermediate focus on the input side which forms the intermediate focal point and is located in the collimated beam path. Such an intermediate focal point can be created, for example, by a diverging lens downstream from the laser input module in the beam path. The diverging lens or perhaps multiple-element diverging group is preferably not swiveled with the swiveling optic but firmly connected to the laser input module.

In another embodiment, the tactile sensor and the swiveling optic are connected to an energy store with an elastic element. The elastic element of the energy store is designed to make available a portion of its stored energy in response to a swiveling-out of the swiveling optic in order to return the optic and sensor to a resting position. The optic and the sensor are coupled to the elastic element by at least two driver stops, only the first of which deforms the elastic element when the optic swivels in the positive swivel axis direction and only the second of which deforms the elastic element when the optic swivels in the negative swivel axis direction.

This embodiment comprises the insight that the coupling between the mechanical sensor and the beam deflection module according to FIGS. 2 and 3 of document EP 1762328 A1 must be implemented with at least two springs in each case, which turns out to be costly, impracticable and not very efficient: The two springs take up quite a voluminous space, and the proneness to error is not sufficiently low when at least two springs are involved. Moreover, in certain constructions, for example the construction according to FIG. 3, when the optic swivels out, only one of the two springs is compressed, while the other spring is not compressed at all and, consequently, no restorative forces are developed, so one spring is useless in each instance for the return of the optic.

In contrast, in this embodiment, it is sufficient and preferred that the energy store have only one elastic element such as, for example, a spring, in order to couple the tactile sensor with the swiveling optic in both swivel axis directions and to effect restorative/centering forces in the direction respectively opposed to the swivel axis direction. As a result, the energy store can be integrated into the device for guiding the laser beam in a very space-saving manner without giving up any functionality. What is more, the energy store is more cost-effective since it can be implemented with only one elastic element, and it turns out to be less error-prone. By virtue of the compact construction that is made possible, space savings are achieved and accessibility is improved. Accordingly, the present invention shows how the advantages of a laser processing optic with tactile tracking as highlighted at the outset can also be achieved through an even more compact, more cost-effective and less error-prone construction without having to sacrifice precision.

At least a portion of the lateral pressing force required by the tactile sensor for the scanning of the target path, i.e., of the joint, for example, is provided by the energy store of the beam guiding device. This pressing force is dependent on the swiveling-out of the swiveling optic. Preferably, when the optic is not swiveled out or in the absence of external forces on the tactile sensor, the energy store is in a defined middle position, and any deflection of the sensor or any deflection of the swiveling optic leads to the compression of the elastic element due to the driver stops, which is to say to an increase in the energy stored in the energy store. With this increase in energy, the restorative forces can be provided by the energy store. In particular, these restorative forces can be provided in a continuously variable manner as a result of the elastic element.

Correspondingly, the elastic element of the energy store can thus be implemented mechanically, for example through a spring, but also pneumatically or electrically. For example, a piston/cylinder arrangement with a pneumatic design or a plunger coil arrangement with an electrical design of the energy store is conceivable. However, by virtue of the specific coupling of the driver stops to the energy store, only a single "elastic element" is necessary here.

In an embodiment of the device for guiding a laser beam that is preferred according to the foregoing, the elastic element is accordingly embodied as a single piece.

In a preferred embodiment, the abovementioned stable middle position is achieved through direct contact of the driver stops with the elastic element when the optic is in the non-swiveled resting position. As soon as the optic swivels out, the elastic element is compressed by precisely one of the two driver stops, thus creating restorative forces.

In a specific embodiment of the device for guiding a laser beam, the elastic element is mounted in a housing having at least two stationary stop surfaces, with the elastic element being pressed only against the first stop surface upon deflection in the positive swivel direction and only against the second stop surface upon deflection in the negative swivel direction. In this embodiment as well, the compression of the elastic element occurs only as a result of one of the two driver stops.

In the absence of external forces, the expansion of the elastic element causes the two driver stops to be oriented in planar fashion with respect to the stationary stops of the housing, as a result of which the tactile sensor is brought to the middle position. If the tactile sensor is deflected by external seam tracking forces, then the elastic element is pressed together by a driver stop and the opposing stationary stop. Through a preferred symmetrical arrangement of the four stop surfaces, this deflection movement is possible along with lateral force in the positive and negative directions of deflection.

In another preferred embodiment, one of the two stop surfaces and one of the two driver stops are arranged such that they can move in a direction of deformation of the elastic element. With one of the two movable stops, the tensile force of the elastic element can thus be adjusted, and any play between the stationary stop surfaces and the driver stops can be reduced with the second movable stop. The adjustment can be made in the middle position of the tactile sensor, for example in the arrangement of a filler wire necessary for the seam formation during joining. As a result, a further increase in the precision of the laser beam guidance is achieved.

If the elastic element is a spring, then, in a preferred embodiment of the device for guiding a laser beam, said spring has thrust washers at both ends, the thrust washers, the driver stops and the stop surfaces each being dome-shaped. As a result, swivel movements can be absorbed by the spring arrangement without separate joints.

In another preferred embodiment, the sensor is spring-mounted via an elastic component approximately in the direction of the laser beam. In this way, constant contact of the sensor with the target path, e.g. with a joint abutment, can be ensured. For example, a telescopic arm and an autofocus of the imaging optic enable the tracking of the focus when the target path changes in the z-direction, i.e., approximately in the direction of the laser beam.

In this embodiment, it is also preferred that the laser beam input module be coupled with the elastic component. In this way, the laser focus can be tracked in the direction of the laser beam.

Preferably, the device for guiding a laser beam is embodied such that the swiveling optic is rigidly connected to the tactile sensor. As a result, it is ensured that the distance between the swiveling optic and the sensor is constant, which is advantageous particularly in the event that the sensor comprises a filler wire necessary for seam formation and is therefore constituted by same, since the laser beam is then always correctly focused.

In a preferred embodiment, the filler wire therefore forms a part of the tactile sensor. The seam tracking then occurs in a wear-free manner directly in the working point through tactile movement of the filler wire. Even in the case of small radii and three-dimensional contours, scanning can be done in this manner. By virtue of this special mechanical sensor, no advance and hence no advance compensation is necessary. Moreover, the scanning process is resistant to the greatest possible extent to interference factors such as dirt or heat, for example. What is more, the simultaneous tracking and joining enables an increase in the clocking frequency and hence a shortening of the laser processing time. Furthermore, the device for guiding a laser beam can be designed to be self-sufficient, which gives it a modular character.

In this embodiment, the tracking of the filler wire is ensured, for example, by a wire feed device, for example one such as that described in EP 1762328 A1.

In a preferred embodiment, the laser beam input module is designed to focus the incident laser beam on the intermediate focal point lying between the laser beam input module and the beam guidance device. In this embodiment, the beam guiding device is designed to track the laser beam by means of the swiveling optic without moving the intermediate focal point. The intermediate focal point therefore forms the constant starting point of an imaginary rotary axis.

The incident laser beam is, for example, a collimated laser beam or a beam made available by a fiber laser, i.e., an output beam of a fiber-optic cable. In the latter case, the end of the fiber can form the intermediate focus. Alternatively, an intermediate imaging optic for focusing is installed between the end of the fiber and the intermediate focal point. If the laser beam is a collimated laser beam, it can be focused on the intermediate focal point by a fixed focusing lens, which can be part of the laser beam input module (true intermediate focus) or, alternatively, by a diverging lens downstream from the laser beam input module and the focal point, which diverging lens is arranged in a fixed manner in the swiveling beam guiding device, for example (virtual intermediate focus).

For example, the laser beam can be generated by a solid-state laser, a diode laser or a fiber laser.

According to a second aspect of the present invention, the technical problem is solved by a laser processing system with a device according to the first aspect of the invention.

All types of lasers may be considered for the laser processing system according to the invention. Particularly, the device according to the invention can be advantageously used as a guidance module in seam-tracked laser welding and soldering, for example for steel and aluminum alloys. To begin with, laser technology is outstandingly suited to joining processes. One particular advantage is the narrow and uniform geometry that is made possible. The joining process can be controlled precisely and be carried out at high speed. The introduction of heat into the component and any resulting distortion are significantly reduced by laser joining. Due to the resulting high-quality joints, post-processing of the seam can be eliminated in most cases. The seam itself can be reproduced with consistently high quality. Now, by virtue of the device according to the invention for guiding a laser beam, this laser joining process can be carried out even more precisely, more cost-effectively and using more reliable devices.

DESCRIPTION OF SAMPLE EMBODIMENTS

Figure 1:
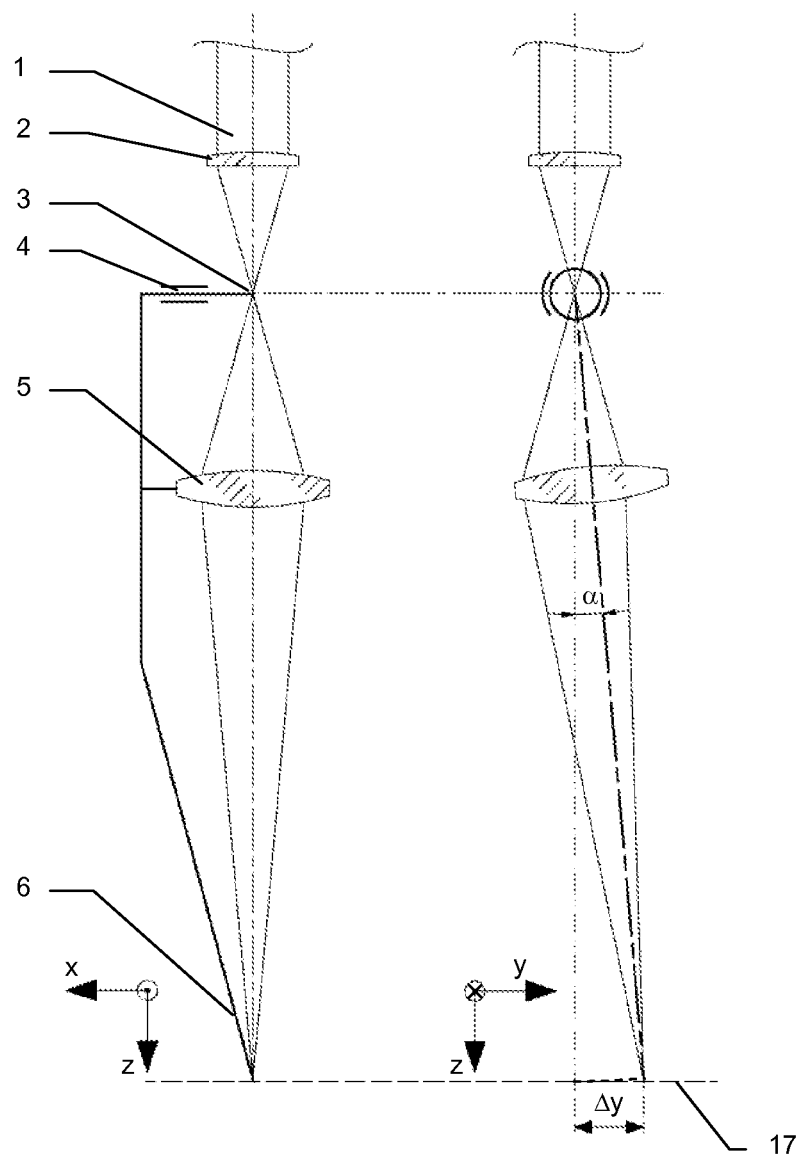
FIG. 1 shows a schematic representation of a beam path for lateral compensation with swiveling of a lens system for optical imaging of an actual intermediate focus about an axis through or near the actual intermediate focus.

FIG. 1 shows a schematic representation of a beam path for lateral compensation in the y-direction (running direction of deflection) by swiveling a swiveling optic 5, which optically images a true intermediate focal point 3 onto a target path on the workpiece 17.

On the input side, a collimated laser beam 1 strikes a fixed focusing lens 2 which forms a laser beam input module. The laser beam input module 2, 10 in the form of the fixed and focused lens 2 focuses the collimated laser beam onto the actual intermediate focal point 3. Arranged downstream from the laser beam input module 2, 10 and the actual intermediate focal point 3 is a swiveling beam guidance device which comprises a tactile sensor 6 and optic 5 that can be swiveled on at least one swivel axis 4. The tactile sensor 6 and the swiveling optic 5 are rigidly connected to each other, and both are connected to an energy store 18 by means of an elastic element not shown in further detail in FIG. 1. The energy store 18 and the mechanical connection of the swiveling optic 5 and the tactile sensor 6 thereto are shown in further detail in FIG. 5.

The target path is scanned by the sensor 6. As a result of the rigid connection and the deflections of the sensor, the laser beam 1 is constantly projected and focused by the swiveling optic 5 onto the target path, for example a joint. The device is designed here such that, upon a deflection Δy of the sensor 6 and the resulting swiveling of the optic 5 by the angle α, as is shown, for example, in the illustration to the right in FIG. 1, the true intermediate focal point 3 is not shifted, but remains stationary. The swivel axis 4 therefore always leads through this intermediate focal point 3. As follows directly from FIG. 1, the swivel-mounted parts of the device are substantially limited to the optic 5, the sensor 6, and the rigid mechanical connection provided by same. As a result of the consequently reduced moment of inertia of the swiveling parts, an even faster and smoother processing of the workpiece 17 is possible with constant focusing of the laser beam.

Figure 5:
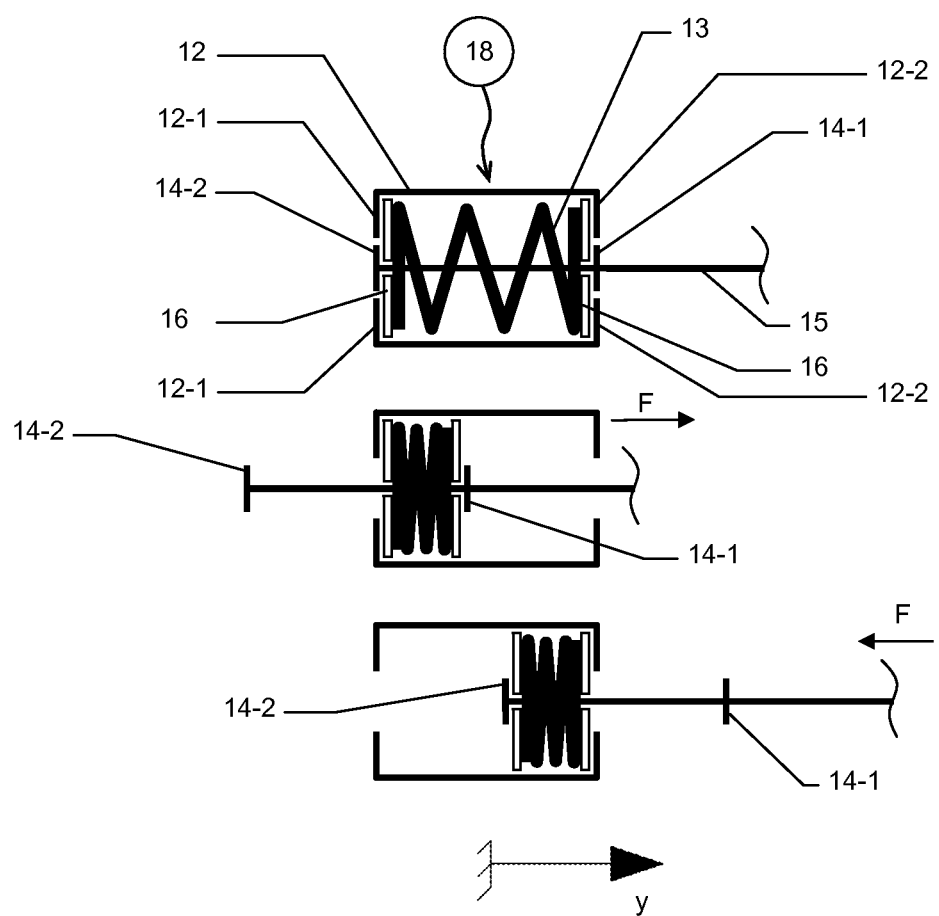
FIG. 5 shows a schematic representation of a sample embodiment of the energy store for generating centering forces/restorative forces.

For example, the sensor 6 is formed by a filler wire that is necessary for seam formation during joining. The filler wire therefore serves simultaneously as a mechanical sensor. The energy store 18 presses the filler wire into the joint. There it is melted by the laser beam. If external forces act on the sensor 6, for example as a result of bending or raising of the joint, then the swiveling optic 5 is swiveled by the swivel angle α as a result of the rigid connection. However, the position of the actual intermediate focal point 3 does not change. As a result of the rigid connection between sensor 6 and swiveling optic 5, the laser remains pointed at the sensor 6, i.e., optionally at the filler wire. With the aid of the energy store 18, restorative forces are generated which act on the swiveling optic 5 and the mechanical sensor 6 and return these two components to the resting position shown in the left part of FIG. 1 in the absence of external forces on the mechanical sensor 6. This energy store 18 is explained in further detail in the following with reference to FIG. 5:

FIG. 5 shows a schematic representation of a sample embodiment of the energy store 18 for generating the abovementioned restorative forces/centering forces. The energy store comprises a single elastic element in the form of a spiral pressure spring 13 which makes a portion of its stored energy available depending on the amplitude of the deflection of the swiveling optic 5 in order to return the optic 5 and sensor 6 to a resting position.

The spiral pressure spring 13 is arranged in a housing 12 with a cylindrical hole. The housing 12 has at each longitudinal end of the cylinder a collar as stationary stop surfaces 12-1 and 12-2. The swiveling optic 5 and the sensor 6 are coupled to the spiral pressure spring 13 via at least two driver stops 14-1 and 14-2. The two driver stops 14-1 and 14-2 can be connected, for example, by means of a kind of tappet 15 to the swiveling optic 5 and hence to the sensor 6.

In the two lower illustrations of FIG. 5, it is shown that, upon swiveling of the optic 5 in the −y direction, only the first driver stop 14-1 deforms the spiral spring 13 (middle illustration) and, in the opposite case (lower illustration), which is to say upon swiveling of the optic 5 in the +y direction, only the second driver stop 14-2 deforms the spiral spring in the other direction. In the depicted example, the tensile force (F) of the spring 13 acts via thrust washers on the stationary stops 12-1 and 12-2 and the driver stops 14-1 and 14-2. As a result of this arrangement of the energy store 18, restorative forces can be generated both in the negative and in the positive swivel direction with only one elastic element 13. So, if the sensor 6 slides over a bend in the joint, for example, this results on the one hand in the deflection of the optic 5 corresponding to the deflection of the sensor 6 and, on the other hand, in the compression of the spiral pressure spring 13 in one of the two possible directions.

In the absence of external forces on the tactile sensor 6, the two driver stops 14-1/14-2 are oriented in planar fashion with respect to the stationary stops 12-1/12-2 of the housing 12 due to the expansion of the spring 13, as a result of which the sensor 6 is brought into the middle position. If the sensor 6 is deflected by external seam tracking forces, then the spring 13 is pressed together by one of the driver stops and the opposing stationary stops. Through the symmetrical arrangement of the four stop surfaces 12-1/12-2 and 141/14-2, this deflectional movement is possible in the positive and negative direction of deflection.

Figure 2:
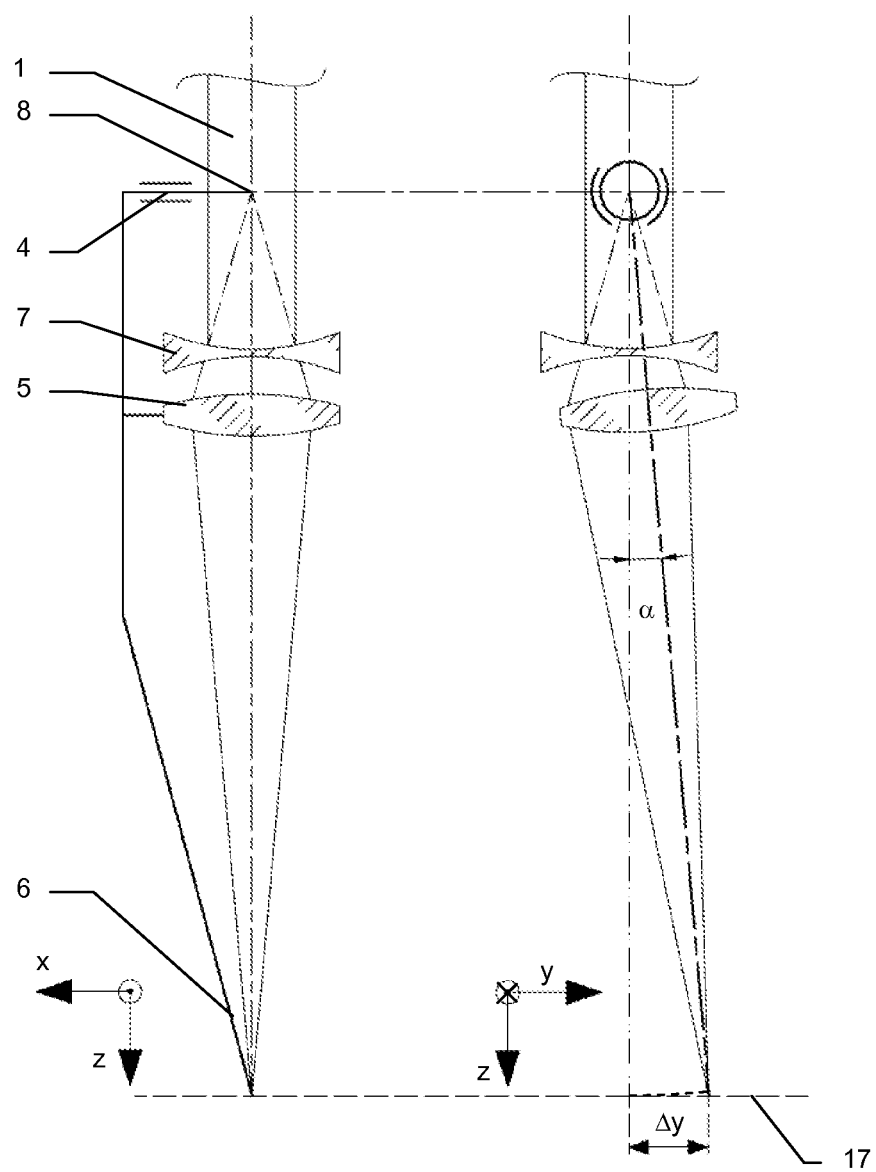
FIG. 2 shows a schematic representation of a beam path for lateral compensation with swiveling of a lens system for optical imaging of a virtual intermediate focus about an axis through or near the virtual intermediate focus.
Figure 3:
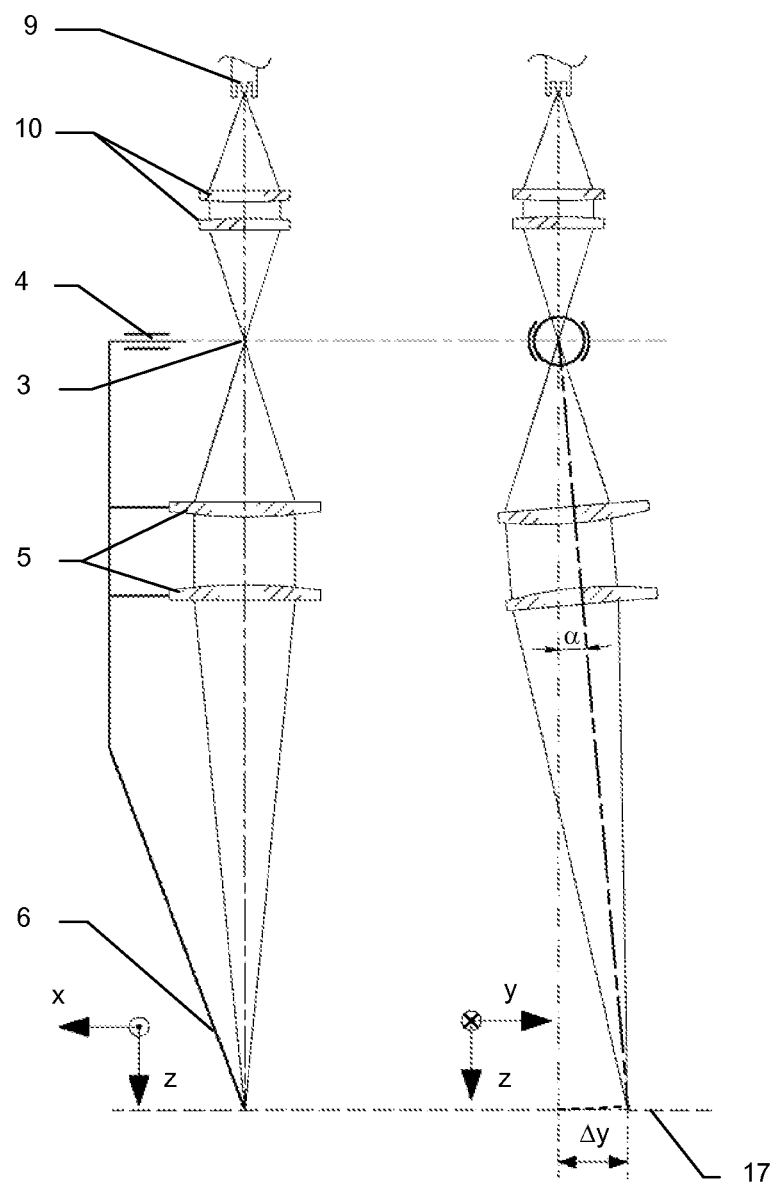
FIG. 3 shows a schematic representation of a beam path for lateral compensation with swiveling of a lens system for optical imaging of an actual intermediate focus after intermediate imaging of a fiber end surface about an axis through or near the actual intermediate focus.
Figure 4:
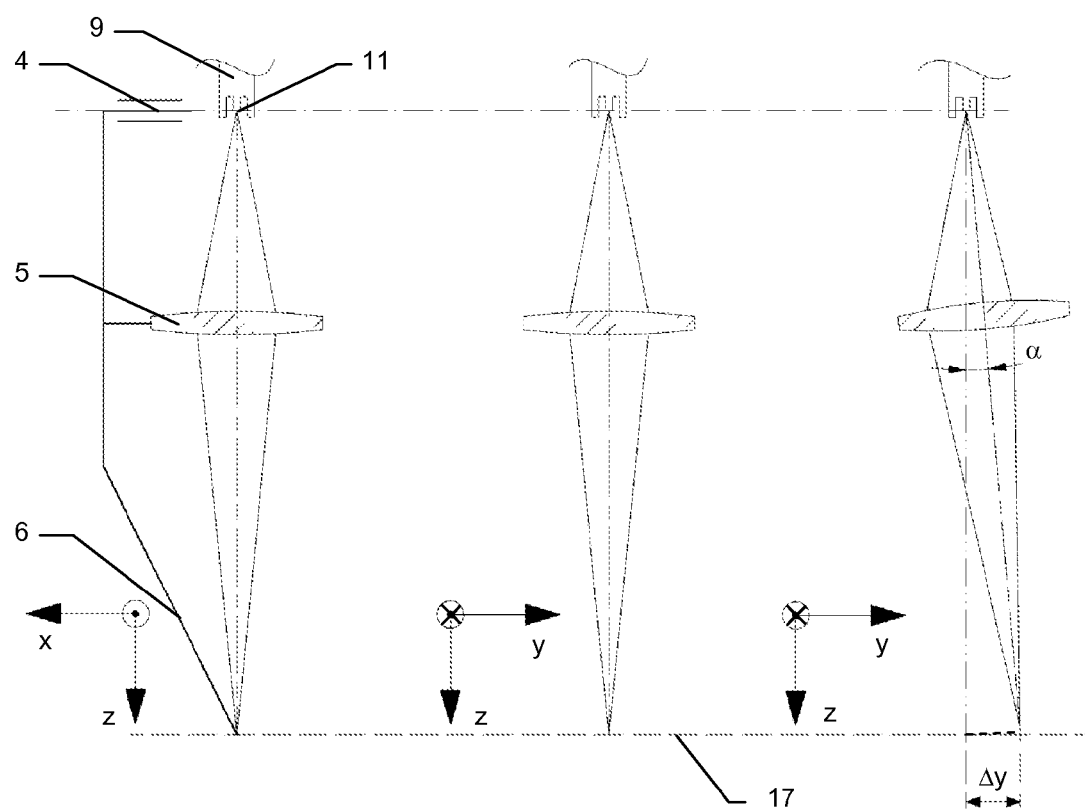
FIG. 4 shows a schematic representation of a beam path for lateral compensation with swiveling of a lens system for the optical imaging of a virtual intermediate focus, represented by a fiber end surface about an axis through or near the virtual intermediate focus.

Shown schematically in FIGS. 2 through 4 are three additional possible embodiments of the device according to the invention for guiding a laser beam; what they all have in common is that the swiveling optic 5 can be moved back into a resting position in the absence of external seam tracking forced by an energy store 18 depicted for the sake of example in FIG. 5.

FIG. 2 shows a variant in which the collimated laser beam 1 does not strike a fixed focusing lens 2, but instead strikes a fixed diverging lens 7 located in the beam path between intermediate focal point 8 and workpiece surface 17. According to this variant, the intermediate focal point 8 is a virtual intermediate focal point. Unlike the swiveling optic 5, the fixed diverging lens 7 is not rigidly connected to the sensor 6 nor, as a consequence, is it rigidly connected to the energy store 18. Rather, the diverging lens 7 is installed firmly in the beam path. But in this embodiment as well, the position of the virtual intermediate focal point 8 does not change upon deflection of the swiveling optic 5 about the swivel angle α, according to the illustration to the right in FIG. 2.

In the embodiment according to FIG. 3, the laser beam 1 is provided by a fiber laser 9. This laser beam 1 first strikes intermediate imaging optic 10, which then focuses the laser beam 1 onto the actual intermediate focal point 3. In this example, the swiveling optic 5 is implemented by a dual-lens arrangement that enables better tracking of the focus on the workpiece 17 in the z-direction. The dual-lens arrangement is firmly connected to the sensor 6 and arranged axially, i.e., in the spacing direction z, in a spring-loaded manner. This ensures that the sensor 6 is in constant contact with the joint abutment and the laser focus is continuously tracked as a result of the rigid connection between sensor 6 and swiveling optic 5.

Finally, FIG. 4 shows a variant in which the laser beam 1, in turn, is provided by a fiber laser 9 and in which the intermediate focal point 3 strikes a point in a fiber end surface 11. According to this variant, no intermediate imaging of the laser beam 1 is performed. The left and middle view each show a non-swiveled state, with the swiveling optic 5 being swiveled out by the swivel angle α in the right view, which results in a lateral deflection Δy.

LIST OF REFERENCE SYMBOLS

1 collimated laser beam
2 fixed focusing lens
3 actual intermediate focal point
4 swivel axis
5 movable imaging optic
6 tactile sensor
7 fixed diverging lens
8 virtual intermediate focal point
9 fiber-optic cable
10 intermediate imaging optic
11 fiber end surface
12 spring housing with stops
12-1, 12-2 stationary stop surfaces
13 spiral pressure spring
14 driver stops
14-1 first driver stop
14-2 second driver stop
15 tappet for coupling of force
16 thrust washers
17 workpiece surface
18 energy store
α swivel angle
Δy resulting lateral deflection
F lateral force
x direction of travel
y lateral direction of deflection
z beam direction

The invention claimed is:

1. Device for guiding a laser beam along a target path, comprising:
   a laser beam input module that is designed to guide an incident laser beam onto a swiveling laser beam guiding device downstream from the laser beam input module, the laser beam guiding device being arranged for projecting the laser beam onto the target path and comprising:
   an optic that can be swiveled along at least one swivel axis and
   a tactile sensor connected to the swiveling optic that is designed to perform a tactile scan of the target path and to deflect the swiveling optic appropriately,
   characterized in that an intermediate focal point is formed in front of the swiveling optic and that the swivel axis of the swiveling optic runs through the intermediate focal point.

2. Device as set forth in claim 1, characterized in that the laser beam input module is designed to focus the laser beam onto the intermediate focal point and the swiveling optic is designed to reproduce the intermediate focal point on the target path.

3. Device as set forth in claim 2, characterized in that the laser beam input module has an optical fiber and intermediate imaging optic, with the intermediate imaging optic being designed to reproduce an end of the optical fiber facing it on the intermediate focal point.

4. Device as set forth in claim 1, characterized in that the laser beam input module is embodied as an optical fiber and the intermediate focal point is located on the side of the optical fiber facing the swiveling optic and the swiveling optic is designed to reproduce the intermediate focal point on the target path.

5. Device as set forth in claim 1, characterized in that laser beam input module is designed to generate a non-focused beam path and the swiveling optic possesses a virtual intermediate focus that forms the intermediate focal point and is located in the collimated beam path.

6. Device as set forth in claim 1, wherein
the tactile sensor and the swiveling optic are connected to an energy store with an elastic element,
the elastic element of the energy store is designed to make available a portion of its stored energy in response to a swiveling-out of the swiveling optic in order to return the optic and sensor to a resting position, and wherein
the optic and the sensor are coupled to the elastic element by at least two driver stops, only the first driver stop deforming the elastic element when the optic swivels in the positive swivel axis direction and only the second driver stop deforming the elastic element when the optic swivels in the negative swivel axis direction.

7. Device as set forth in claim 1, wherein the elastic element is embodied as a single piece.

8. Device as set forth in claim 1, wherein the elastic element is mounted in a housing having at least two stationary stop surfaces, with the elastic element only being pressed against the first stop surface upon deflection in the positive swivel axis direction and only against the second stop surface upon deflection in the negative swivel axis direction.

9. Device as set forth in claim 8, wherein one of the two stop surfaces and one of the two driver stops are arranged such that they can move in a direction of deformation of the elastic element.

10. Device as set forth in claim 8, wherein the elastic element is a mechanical spring that has thrust washers at both ends, with the thrust washers, the driver stops and the stationary stop surfaces each being dome-shaped.

11. Device as set forth in claim 1, wherein the sensor is mounted approximately in the laser beam direction (z) via an elastic component in a spring-loaded manner.

12. Device as set forth in claim 11, wherein the laser beam input module is coupled to the elastic component.

13. Device as set forth in claim 1, wherein the swiveling optic is rigidly connected to the sensor.

14. Device as set forth in claim 1, wherein the sensor comprises a filler wire required for seam formation.

15. Laser processing system with a device as set forth in claim 1.

* * * * *